(12) United States Patent
Ke

(10) Patent No.: US 9,013,147 B2
(45) Date of Patent: Apr. 21, 2015

(54) CIRCUIT AND METHOD FOR CELL BALANCING

(75) Inventor: Jingbo Ke, San Jose, CA (US)

(73) Assignee: O2Micro, Inc., Santa Clara, CA (US)

( * ) Notice: Subject to any disclaimer, the term of this patent is extended or adjusted under 35 U.S.C. 154(b) by 697 days.

(21) Appl. No.: 13/369,049

(22) Filed: Feb. 8, 2012

(65) Prior Publication Data

US 2013/0200850 A1    Aug. 8, 2013

(51) Int. Cl.
*H01M 10/44* (2006.01)
*H01M 10/46* (2006.01)
*H02J 7/00* (2006.01)

(52) U.S. Cl.
CPC ..................... *H02J 7/0016* (2013.01)

(58) Field of Classification Search
USPC .................. 320/116, 118, 119, 133, 135, 155
See application file for complete search history.

(56) References Cited

U.S. PATENT DOCUMENTS

| | | | |
|---|---|---|---|
| 5,153,496 A * | 10/1992 | LaForge | 320/119 |
| 5,578,914 A * | 11/1996 | Morita | 320/122 |
| 6,008,623 A | 12/1999 | Chen et al. | |
| 7,126,312 B2 * | 10/2006 | Moore | 320/157 |
| 7,728,553 B2 * | 6/2010 | Carrier et al. | 320/119 |
| 8,461,806 B2 * | 6/2013 | Lupu et al. | 320/122 |
| 2008/0252257 A1 * | 10/2008 | Sufrin-Disler et al. | 320/118 |

FOREIGN PATENT DOCUMENTS

| | | |
|---|---|---|
| CN | 101414759 A | 4/2009 |
| CN | 101917044 A | 12/2010 |
| TW | 502900 U | 9/2002 |

* cited by examiner

*Primary Examiner* — Edward Tso
(74) *Attorney, Agent, or Firm* — Wang Law Firm, Inc.; Li K. Wang; Stephen Hsu

(57) ABSTRACT

A balancing circuit for balancing multiple cells in a battery. The cell balancing circuit includes a first shunt path connected in parallel to a first cell, a controller coupled to the first shunt path, a timer and a storage unit. The controller balances the cells and detects balance conditions of each cell. The timer measures pre-balance times and balance times for each cell. The storage unit stores the pre-balance times and balance times. The controller pre-balances the first cell by enabling the first shunt path for a first pre-balance time and balances the first cell by enabling the first shunt path for a first balance time if an unbalance condition of the first cell is detected by the controller, and updates the first pre-balance time for each balancing cycle based on the first pre-balance time and the first balance time from a previous balancing cycle.

15 Claims, 6 Drawing Sheets

| BALANCING CYCLE | PRE-BALANCE TIME | | | PRE-BALANCE TIME AFTER ADJUSTMENT | | | BALANCE TIME | | |
|---|---|---|---|---|---|---|---|---|---|
| | CELL-A | CELL-B | CELL-C | CELL-A | CELL-B | CELL-C | CELL-A | CELL-B | CELL-C |
| 1 | 0 | 0 | 0 | 0 | 0 | 0 | A1 | B1 | C1 |
| 2 | A1 | B1 | C1 | A1-M1 | B1-M1 | C1-M1 | A2 | B2 | C2 |
| 3 | A1-M1+A2 | B1-M1+B2 | C1-M1+C2 | A1-M1+A2-M2 | B1-M1+B2-M2 | C1-M1+C2-M2 | A3 | B3 | C3 |
| ... | ... | ... | ... | ... | ... | ... | ... | ... | ... |

CIRCUIT AND METHOD FOR CELL BALANCING

BACKGROUND

A typical Lithium-Ion (Li-Ion) battery pack, when used as a DC voltage power supply, usually includes a group of battery cells connected in series. When the group of cells connected in series are charged for a time period, voltages of some cells increase faster than voltages of other cells due to different characteristic of each cell. In one instance, a cell is unbalanced if the voltage of the cell is greater than a predetermined threshold. In another instance, a cell is unbalanced if a first voltage of this cell is greater than a second voltage of another cell and the voltage difference between the first voltage and the second voltage is greater than a predetermined threshold. Since voltages of some cells increase faster than voltages of other cells, at the end of a balancing cycle, the cells may have different cell voltages.

FIG. 1 illustrates a conventional charging circuit 100 for charging a battery pack including multiple cells 101, 102 and 103. The cells 101, 102 and 103 are connected in series with a switch 130. A charger 110 charges the cells 101, 102 and 103. During the charging operation, if any cell voltage reaches a predetermined threshold, the charger 110 turns off the switch 130 and the charging of cells 101, 102 and 103 are stopped. As the result, at the end of the balancing cycle, some cells are not fully charged.

FIG. 2 shows another conventional charging circuit 200 which utilizes multiple chargers 201, 202 and 203 to charge multiple cells 101, 102 and 103. The drawback for this charging circuit 200 is that the cost of the charging circuit 200 is increased because each cell has a charger.

SUMMARY

According to one embodiment of the invention, there is provided a balancing circuit for balancing multiple cells in a battery connected in series. The cell balancing circuit includes a first shunt path connected in parallel to a first cell, a controller coupled to the first shunt path, a timer and a storage unit. The controller balances the cells and detects balance conditions of each cell. The timer measures pre-balance times and balance times for each cell. The storage unit stores the pre-balance times and balance times. The controller pre-balances the first cell by enabling the first shunt path for a first pre-balance time and balances the first cell by enabling the first shunt path for a first balance time if an unbalance condition of the first cell is detected by the controller, and updates the first pre-balance time for each balancing cycle based on the first pre-balance time and the first balance time from a previous balancing cycle.

According to another embodiment of the invention, there is provided a controller for balancing multiple cells. The controller includes a sensing unit for monitoring cell voltage of each cell, a timer for measuring balancing time for each cell, a storage unit for storing the balancing time for each cell, and a control unit for controlling pre-balancing and balancing of each cell according to the cell voltage sensed by the sensing unit and the balancing time retrieved from the storage unit. The controller pre-balances a first cell by enabling a first shunt path connected in parallel to the first cell for a first pre-balance time and balances the first cell by enabling the first shunt path for a first balance time if an unbalance condition of the first cell is detected by the controller based on the cell voltage sensed by the sensing unit.

According to yet another embodiment of the invention there is provided a method for balancing multiple cells of a battery. The method includes pre-balancing a first cell by enabling a first shunt path connected in parallel to the first cell for a first pre-balance time; monitoring an unbalanced condition of the first cell; balancing the first cell by enabling the first shunt path for a first balance time if the first cell is unbalanced; measuring the first balance time of the first cell; and updating the first pre-balance time for each balancing cycle based on the first pre-balance time and the first balance time from a previous balancing cycle.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

FIG. 5 illustrates the contents stored in a storage unit in FIG. 3, in accordance with another embodiment of the present invention.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

The present invention provides a balancing circuit and a method for balancing multiple cells. In a first stage of a balancing cycle, the balancing circuit according to the present invention pre-balances a cell by enabling a shunt current of the cell no matter the cell is unbalanced or not. In a second stage of the balancing cycle, the cell is charged with the shunt current disabled until the cell is detected to be unbalanced. At that time, the balancing circuit enables the shunt current of the cell to balance the cell until the cell becomes balanced. More specifically, the balancing circuit pre-balances a cell for a first pre-balance time in a first balancing cycle, and balances the cell for a first balance time in the first balancing cycle if the first cell is unbalanced. The first balance time of the cell in the first balancing cycle is measured. The balancing circuit determines a second pre-balance time of the cell for a second cycle based on the first pre-balance time and the first balance time. The purpose of pre-balancing a cell in a battery with multiple cells is to ensure all cells achieve similar end voltages at a time point when a battery charger switches the charge mode from the constant current mode to the constant voltage mode. The pre-balancing operation consists of charging a particular cell with a current that is different from the regular current for a pre-balance time before switching the current to the regular current. The pre-balance time is determined based on the actual operation of each cell which is evaluated through previous balancing cycles, rather than the unbalanced condition detected in the current balancing cycle. By charging the particular cell with a different current, the time when that particular cell will achieve a desired voltage can be controlled. By being able to control the charging pace of each individual cell, it can ensure that all cells in the battery have a similar voltage at the time point when the charger switches the charge mode from the constant current mode to the constant voltage mode.

Figure 1:
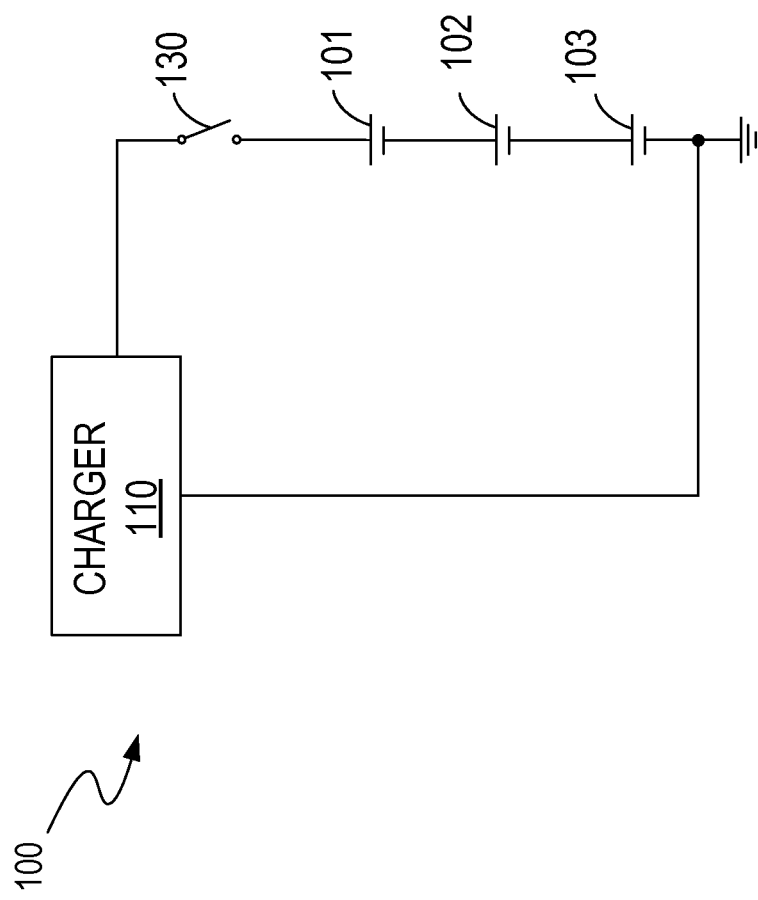
FIG. 1 illustrates a conventional charging circuit.
Figure 2:
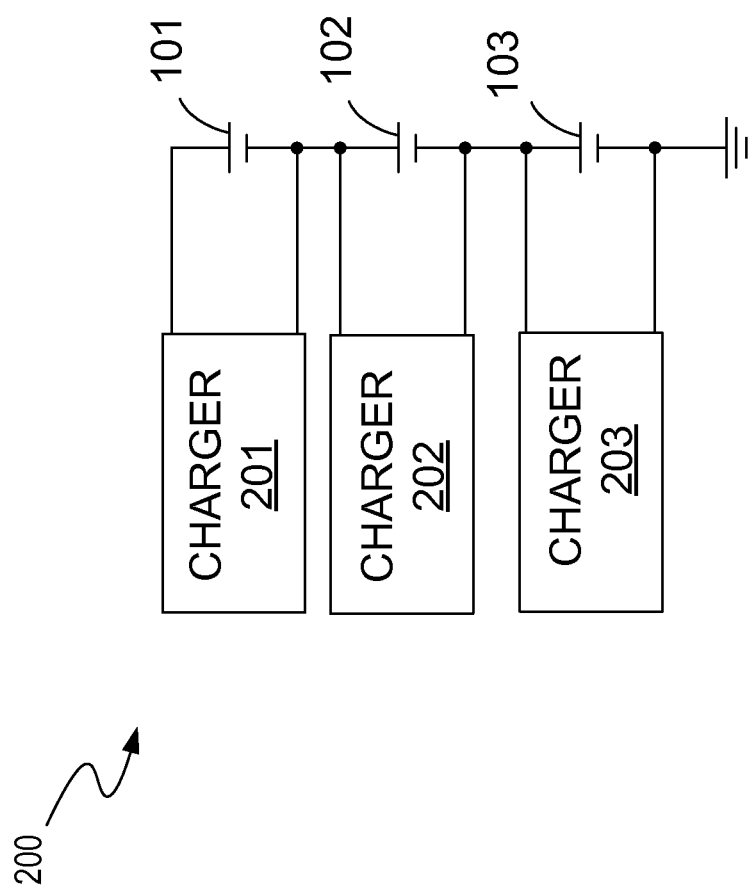
FIG. 2 illustrates another conventional charging circuit.
Figure 3:
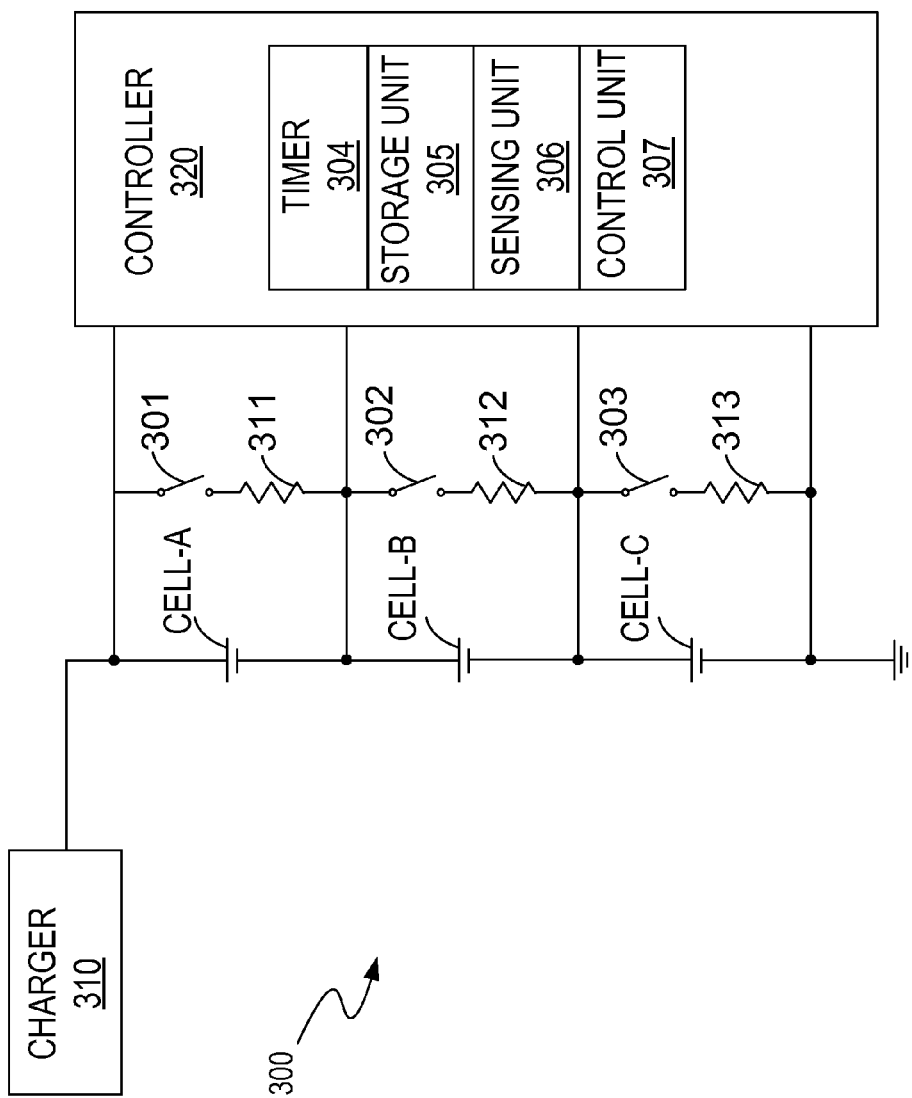
FIG. 3 illustrates a cell balancing circuit, in accordance with one embodiment of the present invention.
Figure 4:
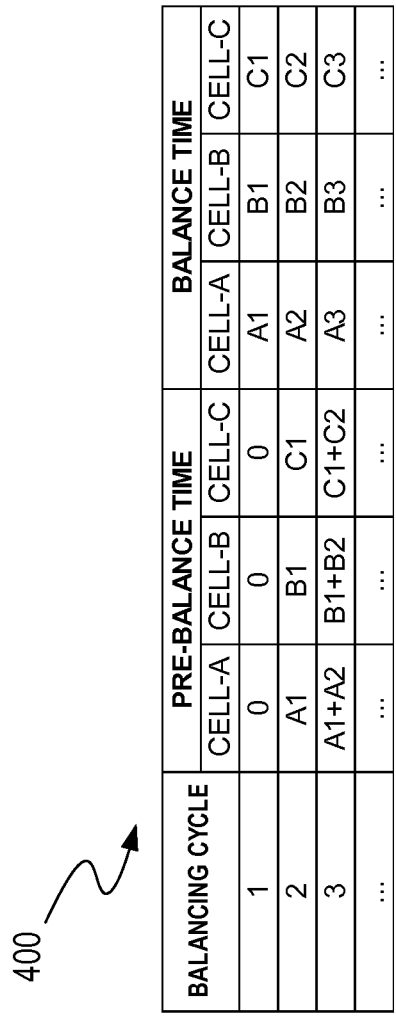
FIG. 4 illustrates the contents stored in a storage unit in FIG. 3, in accordance with one embodiment of the present invention.

FIG. 3 illustrates a cell balancing circuit 300 for balancing multiple cells in a battery pack, in accordance with one embodiment of the present invention. For illustrative purpose, in the example of FIG. 3, there are three cells CELL-A, CELL-B and CELL-C coupled in series. However, the battery pack can include any number of cells. The cells CELL-A, CELL-B and CELL-C are charged by a charger 310. The charger 310 is configured to charge the cells under a constant current mode first and then to charge the cells under a constant voltage mode. The time when the charger 310 switches the charge mode from the constant current mode to the constant voltage mode is referred to as Tp. Advantageously, the cell balancing circuit 300 can ensure that all cells in the battery have a similar voltage at time Tp. The cell balancing circuit 300 includes multiple shunt paths, each path coupled to a corresponding cell in parallel. For example, a first shunt path including a switch 301 and a resistor 311 is coupled to the cell CELL-A in parallel for enabling a shunt current for the cell CELL-A. Similarly, a second shunt path including a switch 302 and a resistor 312 is coupled to the cell CELL-B in parallel for enabling a shunt current for the cell CELL-B. A third shunt path including a switch 303 and a resistor 313 is coupled to the cell CELL-C in parallel for enabling a shunt current for the cell CELL-C. The cell balancing circuit 300 further includes a controller 320 coupled to the first, second and third shunt paths. The conductance of the shunt paths is controlled by the controller 320. The controller 320 includes a sensing unit 306 for monitoring cell voltage of each cell, a timer 304 that measures a balance time of each cell, a storage unit 305 that stores a balance time of each cell measured in a current cycle and a pre-balance time of each cell for a next balancing cycle, and a control unit 307 for controlling prebalancing and balancing of each cell according to the cell voltage sensed by the sensing unit 306 and the balance time retrieved from the storage unit 305. FIG. 4 illustrates the contents stored in the storage unit 305 in FIG. 3, in accordance with one embodiment of the present invention. FIG. 4 is described in combination with FIG. 3.

In operation, in a first balancing cycle, the charger 310 charges the cells CELL-A, CELL-B and CELL-C. The controller 320 accesses the storage unit 305 and obtains prebalance time for the cells CELL-A, CELL-B and CELL-C. For the first balancing cycle, the pre-balance time of cells CELL-A, CELL-B and CELL-C are set to an initially value, e.g., zero. Then the cell balancing circuit 300 monitors the voltage of each cell by the sensing unit 306 to determine whether any unbalanced condition occurs. In one embodiment, a cell is unbalanced if the voltage of the cell is greater than a predetermined threshold. In another embodiment, a cell is unbalanced if a first voltage of this cell is greater than a second voltage of another cell, and a voltage difference between the first voltage and the second voltage is greater than a predetermined threshold. If a cell is found to be unbalanced, the controller 320 controls a conductance of a corresponding shunt path of the cell by the control unit 307 to enable a shunt current and therefore to balance the cell. For example, if the cell CELL-A is detected to be unbalanced, the control unit 307 turns on the switch 301 to enable a shunt current to flow from a positive terminal of the cell CELL-A through the switch 301 and the resistor 311 to a negative terminal of the cell CELL-A. By diverting a part of the current through the shunt path formed by the switch 301 and the resistor 311, the charging of the cell CELL-A is slowed down and therefore the rate at which a cell voltage of a cell CELL-A increases is reduced. If the cell CELL-A becomes balanced at time T1, e.g., the voltage difference between the cell CELL-A and another cell is reduced to below a predetermined threshold, the control unit 307 turns off the switch 301 at time T1 to disable the shunt current.

In one embodiment, the controller 310 can also controls the flow of current through the shunt path of the cell CELL-A in multiple discrete time slots if the cell CELL-A is unbalanced. For example, the controller 310 turns on the switch 301 at time T0 if the cell CELL-A is detected to be unbalanced. At time T1, if the controller 320 detects that the cell CELL-A becomes balanced, the controller 320 turns off the switch 301 to disable the shunt current at time T1. At time T2, the cell CELL-A becomes unbalanced again, and the controller 310 turns on the switch 301 again to balance the cell CELL-A until the controller 310 detects that the cell CELL-A becomes balanced again at time T3. The timer 304 measures the balance time of each discrete time slot. The controller 320 sums up the balance time of each time slot to generate a balance time A1 of the cell CELL-A for the first balancing cycle, and stores the balance time A1 in the storage unit 305. Assume that the cell CELL-A remains balanced throughout the rest time of this first balancing cycle in the above example, the balance time A1 of the cell CELL-A for the first balancing cycle is (T1−T0)+(T3−T2). Here, the balance time refers to the time period during which a shunt current flows through the shunt path of the cell CELL-A. Afterwards, the controller 320 determines a pre-balance time of the cell CELL-A for a second balancing cycle based on the pre-balance time of the cell CELL-A for the first balancing cycle and the balance time of the cell CELL-A for the first balancing cycle.

In a first embodiment, the determination of the pre-balance time for the cell CELL-A for the second balancing cycle is done by the controller 320 adding up the pre-balance time of the cell CELL-A for the first balancing cycle (0 according to the above example) and the balance time of the cell CELL-A for the first balancing cycle (A1 according to the above example). The pre-balance time A1 is stored in the storage unit 305 (as shown in FIG. 4). Similarly, the controller 320 determines and stores pre-balance time B1 and C1 of the cells CELL-B and the cell CELL-C for the second balancing cycle.

In the second balancing cycle, the controller 320 accesses the storage unit 305 and obtains the pre-balance time A1, B1, C1 of the cells CELL-A, CELL-B and CELL-C for the second balancing cycle, and pre-balances the cells CELL-A, CELL-B and CELL-C for the pre-balance time A1, B1, C1 respectively. The pre-balancing is done by the controller 320 enabling the corresponding shunt path of the cells CELL-A, CELL-B and CELL-C for the pre-balance time A1, B1, C1 respectively. At the end of the pre-balance time, each cell is charged by the charger 310 with corresponding shunt paths cut off. Then the controller 320 monitors cell voltage of each cell and balances any unbalanced cells, measures and stores the balance time of each cell. Assume that the balance time of the cells CELL-A, CELL-B and CELL-C for the second balancing cycle are A2, B2, and C2.

In the first embodiment, the pre-balance time for the cell CELL-A for a third balancing cycle is calculated by adding up the pre-balance time A1 of the cell CELL-A for the second balancing cycle and the measured balance time A2 of the cell CELL-A for the second balancing cycle (as shown in FIG. 4).

The pre-balance time A1+A2 is stored in the storage unit 305 as the pre-balance time for the third balancing cycle for cell CELL-A. Similarly, the controller 320 determines and stores pre-balance time B1+B2 and C1+C2 of the cells CELL-B and the cell CELL-C for the third balancing cycle respectively. In the third balancing cycle, the cells CELL-A, CELL-B and CELL-C are pre-balanced for the pre-balance time A1+A2, B1+B2 and C1+C2 respectively.

In a second embodiment, the pre-balance time for the cell CELL-A for an N balancing cycle is a function of the pre-balance time $A1_{N-1}$ of the cell CELL-A for the (N−1) balancing cycle and the measured balance time $A2_{N-1}$ of the cell CELL-A for the (N−1) balancing cycle. For example, the pre-balance time for the cell CELL-A for an N balancing cycle is calculated by $K1*A1_{N-1}+K2*A2_{N-1}+K3$. The coefficient K1, K2 and K3 can be constant or variable.

As described above, the controller 320 updates the pre-balance time of the cell CELL-A for each balancing cycle based on the pre-balance time and the balance time of the cell CELL-A from a previous balancing cycle. In other words, the cell balancing circuit 300 determines pre-balance time of the cells CELL-A, CELL-B and CELL-C based on the actual operation of each cell which is evaluated through previous balancing cycles. For example, in the first balancing cycle, if the balance time A1 of the cell CELL-A is longer than the balance time B1 and C1 of the cells CELL-B and CELL-C, it indicates that the cell voltage of the cell CELL-A increases faster than those of the cells CELL-B and CELL-C during charging. Then, in the second balancing cycle, the cell CELL-A is firstly pre-balanced for a pre-balance time A1 which is longer than B1 and C1. In other words, at the beginning of the second balancing cycle, the controller 320 enables the corresponding shunt path of the cells CELL-A, CELL-B and CELL-C for the pre-balance time A1, B1, C1 respectively. Because the pre-balance time A1 is longer than the pre-balance time B1 and the pre-balance time C1, shunt currents of cells CELL-B and CELL-C are disabled earlier than shunt current for cell CELL-A. After shunt currents of cells CELL-B and CELL-C are disabled, cells CELL-B and CELL-C start to charge normally while shunt current for cell CELL-A is still enabled. At the end of the pre-balance time A1, current of cell CELL-A is disabled and cell CELL-A starts to charge normally. Although cell CELL-A started charging later than CELL-B and CELL-C, the cell voltage of the cell CELL-A increases faster than those of the cells CELL-B and CELL-C during charging. As a result, at the end of the second balancing cycle, the cell voltages of the cells CELL-A, CELL-B and CELL-C tend to reach a predetermined voltage level at a time TP. In one embodiment, the charger 310 is configured to charge the cells under a constant current mode until time TP and is configured to charge the cells under a constant voltage mode after time TP. At the beginning of a balancing cycle, the cell voltages are relatively low, so the charging current is limited to a predetermined constant current level to protect the cells from being damaged. Near the end of the balancing cycle, the cell voltages increase near a target voltage. Then the cells are configured to be charged under the target voltage such that the cells will not be over-charged beyond the target voltage. Advantageously, each cell can be well balanced.

Furthermore, the rate at which a cell voltage of a cell increases may change abruptly when the cell voltage is approaching a predetermined voltage level after which the charge mode is switched from constant current mode to constant voltage mode. If the cell is detected as unbalanced at that moment, this cell needs relative large shunt current to balance the cell, which generates large amount of heat. However, according to the present invention, a cell which needs longer balance time (e.g., cell CELL-A in the above example) is pre-balanced with relatively longer balance time in the pre-balance phase at the beginning of a balancing cycle, before its cell voltage increases near the predetermined voltage level. Therefore, the shunt current for the cell CELL-A remains relatively small, and thus the heat generated by the shunt current is decreased.

More advantageously, the cell balancing circuit 300 evaluates characteristics of each cell during each balancing cycle and dynamically adjusts the pre-balance time after each balancing cycle. Because of dynamic adjustment, the pre-balance time reflects characteristics of each cell more accurately. In the example above, when determining the pre-balance time for the third balancing cycle, the cell balancing circuit 300 considers not only the newly measured balance time A2, B2 and C2 of the second balancing cycle, but also the pre-balance time A1, B1 and C1 of the second balancing cycle. The pre-balance time A1+A2, B1+B2 and C1+C2 for the third balancing cycle reflect the characteristics of the cells CELL-A, CELL-B and CELL-C which are evaluated through all the previous balancing cycles. Consequently, the effect of cell balance is further improved.

In a third embodiment of the present invention, the cell balancing circuit 300 further adjusts the pre-balance time of each cell based on a minimum value among the pre-balance time of the cells CELL-A, CELL-B and CELL-C. FIG. 5 illustrates the contents stored in a storage unit in FIG. 3, in accordance with the second embodiment of the present invention. FIG. 5 is described in combination with FIG. 3.

In the first balancing cycle, the controller 320 retrieves a pre-balance time for the cells CELL-A, CELL-B and CELL-C from the storage unit 305. For the first balancing cycle, the pre-balance time of cells CELL-A, CELL-B and CELL-C are set to an initially value, e.g., zero. Then the cell balancing circuit 300 monitors each cell to determine whether any unbalanced condition occurs. The controller 320 determines pre-balance time A1, B1 and C1 of the cells CELL-A, CELL-B and the cell CELL-C for the second balancing cycle by adding the pre-balance time of each cell for the first balancing cycle (0 according to the above example) with the balance time of each cell for the first balancing cycle (A1, B1 and C1 according to the above example). The updated pre-balance time A1, B1 and C1 are stored in the storage unit 305. Then the controller 320 further adjusts the pre-balance time of each cell for the second balancing cycle based on a minimum value M1 among the updated pre-balance time A1, B1 and C1 of the cells CELL-A, CELL-B and the cell CELL-C. The controller 320 adjusts pre-balance time of each cell by subtracting the minimum value M1 from each pre-balance time A1, B1 and C1. After the adjustment, the pre-balance times A1−M1, B1−M1, and C1−M1 are stored in the storage unit 305.

In a second balancing cycle, the cells CELL-A, CELL-B and the cell CELL-C are pre-balanced for the pre-balance times A1−M1, B1−M1, and C1−M1 respectively. Then the controller 320 balances any unbalanced cells, measures and stores the balance time of the cells CELL-A, CELL-B and CELL-C. Assume that the balance time of the cells CELL-A, CELL-B and CELL-C for the second balancing cycle are A2, B2, and C2. The balance controller 320 adds up the pre-balance time A1−M1 of the cell CELL-A for the second balancing cycle and the balance time A2 of the cell CELL-A for the second balancing cycle to determine a pre-balance time A1−M1+A2 of the cell CELL-A for a third balancing cycle. The updated pre-balance time A1−M1+A2 is stored in the storage unit 305. Similarly, the controller 320 determines and stores updated pre-balance times B1−M1+B2 and C1−M1+C2 of the cells CELL-B and the cell CELL-C for the third balancing cycle respectively. Assume that the minimum value among A1−M1+A2, B1−M1+B2 and C1−M1+C2 is M2. The controller 320 further adjusts the pre-balance time of each cell for the second balancing cycle by subtracting the minimum value M2 from each pre-balance time A1−M1+A2, B1−M1+B2 and C1−M1+C2. Accordingly, the pre-balance times after adjustments are A1−M1+A2−M2, B1−M1+B2−M2 and C1−M1+C2−M2, which are stored in the storage unit 305. In the third balancing cycle, the cells CELL-A, CELL-B and CELL-C are pre-balanced for the pre-balance times A1−M1+A2−M2, B1−M1+B2−M2 and C1−M1+C2−M2 respectively.

Advantageously, by reducing a common pre-balance time (i.e., the minimum value among the pre-balance time of the cells), the balancing efficiency are further improved.

Figure 6:
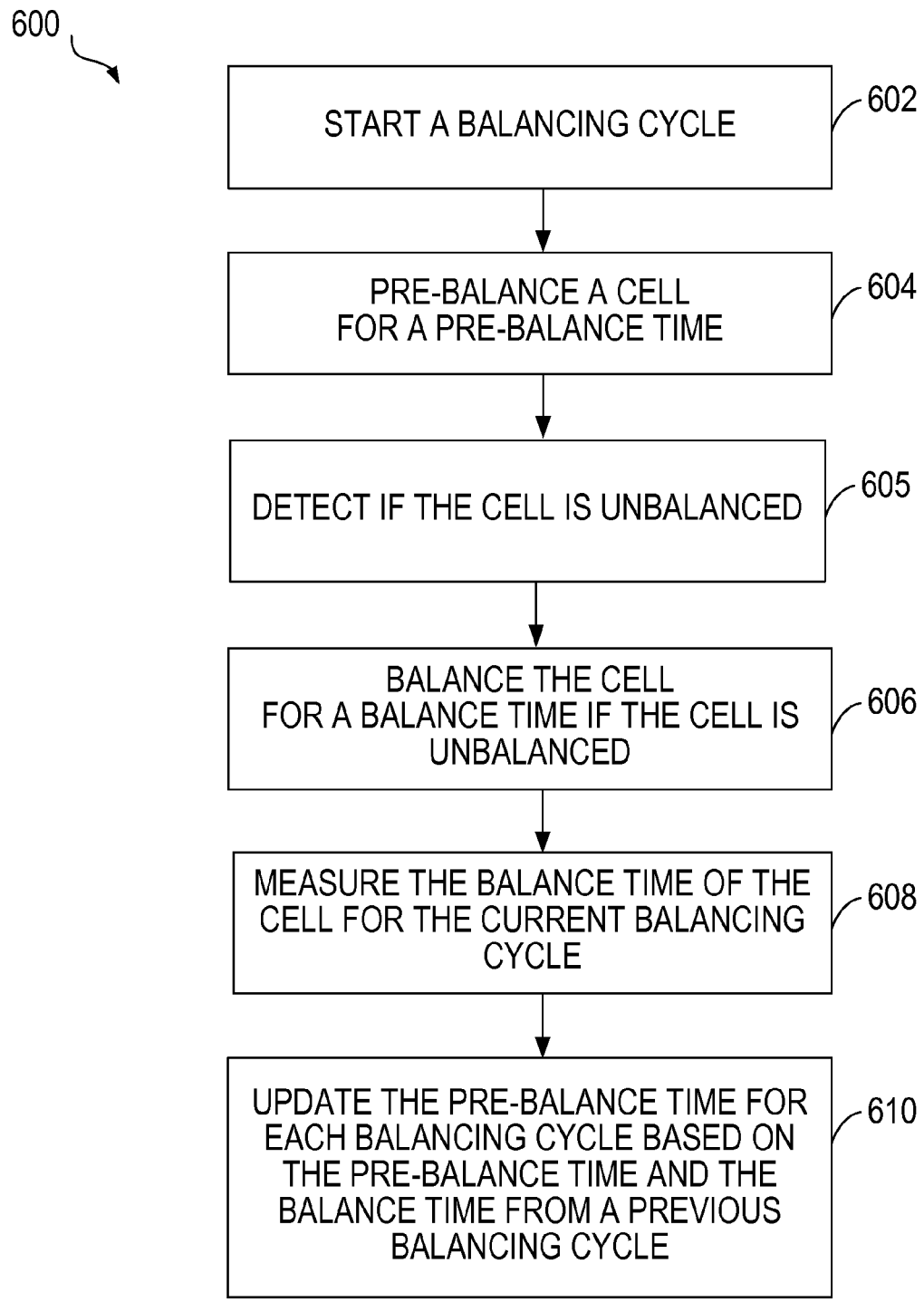
FIG. 6 illustrates a flowchart of a method for balancing multiple cells, in accordance with one embodiment of the present invention.

FIG. 6 illustrates a flowchart 600 of a method for balancing multiple cells by a cell balancing circuit, in accordance with one embodiment of the present invention. FIG. 6 is described in combination with FIG. 3.

In step 602, a balancing cycle is started for a battery with multiple cells and the cells are charged by a charger. In step 604, a cell is pre-balanced for a pre-balance time. The pre-balancing may not be needed when the battery is charged for the first time. The pre-balance time is retrieved from a storage unit 305. In step 605, a cell voltage of the cell is monitored to detect if the cell is unbalanced. In step 606, the cell is balanced for a balance time if the cell is unbalanced. In step 608, the balance time of the cell for the current balancing cycle is measured by a timer 304. The balance time of the cell for the current balancing cycle is stored in a storage unit 305. In step 610, the pre-balance time of the cell is updated for each balancing cycle based on the pre-balance time and the balance time of the cell from a previous balancing cycle. In one embodiment, a controller 320 adds up the pre-balance time and the balance time of the cell from a previous balancing cycle to generate the pre-balance time of the cell for a next balancing cycle. In another embodiment, the pre-balance time for the cell CELL-A for an N balancing cycle is a function of the pre-balance time $A1_{N-1}$ of the cell CELL-A for the (N−1) balancing cycle and the measured balance time $A2_{N-1}$ of the cell CELL-A for the (N−1) balancing cycle. For example, the pre-balance time for the cell CELL-A for an N balancing cycle is calculated by $K1*A1_{N-1}+K2*A2_{N-1}+K3$. The coefficient K1, K2 and K3 can be constant or variable. In yet another embodiment, the controller 320 further adjusts the pre-balance time of the cell for the next balancing cycle based on a minimum value among multiple pre-balance time of multiple cells for the next balancing cycle.

The steps in FIG. 6 can be performed by a controller which is coupled to the cells CELL-A, CELL-B and CELL-C. The controller can include an operation unit, a storage unit, a timer and multiple I/O ports. The operation unit executives program that stored in the storage unit to perform the functions described in FIG. 6. The controller obtains cell voltage and controls shunt paths of the cells via the I/O ports. The timer measures the balance time of each cell. The operation unit updates pre-balance time of each cell for each balancing cycle and further adjusts the pre-balance time of each cell for the next balancing cycle. The pre-balance time of each cell for the next balancing cycle is stored in the storage unit.

As described above, the present invention provides a balancing circuit and a method for balancing multiple cells. The characteristic of each cell is evaluated in each cycle to dynamically adjust a pre-balance time of each cell for a next balancing cycle. Advantageously, each cell can be well balanced and the shunt current remains relatively small.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A cell balancing circuit, for balancing a plurality of cells in a battery connected in series, comprising:
    a first shunt path, for a first shunt current, connected in parallel to a first cell;
    a controller, for balancing the plurality of cells and for detecting balance conditions of each cell, coupled to the first shunt path;
    a timer for measuring balance times for each cell; and
    a storage unit for storing the balance times,
    wherein
        the controller pre-balances the first cell by enabling the first shunt path for a first pre-balance time and balances the first cell by enabling the first shunt path for a first balance time if an unbalance condition of the first cell is detected by the controller, and
        the controller updates the first pre-balance time for each balancing cycle based on the first pre-balance time and the first balance time from a previous balancing cycle.

2. The cell balancing circuit of claim 1, wherein the controller updates the first pre-balance time of the first cell based on a sum of the first pre-balance time and the first balance time from the previous balancing cycle.

3. The cell balancing circuit of claim 1, further comprising a second shunt path connected in parallel to a second cell, wherein the controller pre-balances the second cell by enabling the second shunt path for a second pre-balance time and balances the second cell by enabling the second shunt path for a second balance time if an unbalance condition of the second cell is detected by the controller, and wherein the controller updates the second pre-balance time for each balancing cycle based on the second pre-balance time and the second balance time from a previous balancing cycle, and wherein the controller further adjusts the first pre-balance time of the first cell and the second pre-balance time of the second cell based on a minimum value between the updated first pre-balance time and the updated second pre-balance time.

4. The cell balancing circuit of claim 3, wherein the controller adjusts the first pre-balance time of the first cell by subtracting the minimum value from the first updated pre-balance time.

5. The cell balancing circuit of claim 1, wherein the controller enables the first shunt path in a plurality of discrete time slots if the first cell is unbalanced, and generates the first balance time by summing up the discrete time slots.

6. A controller for balancing a plurality of cells connected in series, the controller comprising:
    a sensing unit for monitoring cell voltage of each cell;
    a timer for measuring balancing time for each cell;
    a storage unit for storing the balancing time for each cell; and a control unit for controlling pre-balancing and balancing of each cell according to the cell voltage sensed by the sensing unit and the balancing time retrieved from the storage unit, wherein the controller pre-balances a first cell by enabling a first shunt path connected in parallel to the first cell for a first pre-balance time and balances the first cell by enabling the first shunt path for a first balance time if an unbalance condition of the first cell is detected by the controller based on the cell voltage sensed by the sensing unit.

7. The controller of claim 6, wherein the controller updates the first pre-balance time for each balancing cycle based on the first pre-balance time and the first balance time from a previous balancing cycle.

8. The controller of claim 7, wherein the controller updates the first pre-balance time of the first cell based on a sum of the first pre-balance time and the first balance time from the previous balancing cycle.

9. The controller of claim 7, wherein the controller pre-balances a second cell by enabling a second shunt path connected in parallel to the second cell for a second pre-balance time and balances the second cell by enabling the second shunt path for a second balance time if an unbalance condition of the second cell is detected by the controller, and wherein the controller updates the second pre-balance time for each balancing cycle based on the second pre-balance time and the second balance time from a previous balancing cycle, and wherein the controller further adjusts the first pre-balance time of the first cell and the second pre-balance time of the second cell based on a minimum value between the updated first pre-balance time and the updated second pre-balance time.

10. The controller of claim 9, wherein the controller adjusts the first pre-balance time of the first cell by subtracting the minimum value from the first updated pre-balance time.

11. A method for balancing a plurality of cells of a battery connected in series, comprising:

pre-balancing a first cell by enabling a first shunt path connected in parallel to the first cell for a first pre-balance time;

monitoring an unbalanced condition of the first cell;

balancing the first cell by enabling the first shunt path for a first balance time if the first cell is unbalanced;

measuring the first balance time of the first cell; and updating the first pre-balance time for each balancing cycle based on the first pre-balance time and the first balance time from a previous balancing cycle.

12. The method of claim 11, further comprising:

updating the first pre-balance time by adding up the first pre-balance time of the first cell and the first balance time of the first cell from the previous balancing cycle.

13. The method of claim 11, further comprising:

pre-balancing a second cell by enabling a second shunt path connected in parallel to the second cell for a second pre-balance time;

monitoring an unbalanced condition of the second cell;

balancing the second cell by enabling the second shunt path for a second balance time if the second cell is unbalanced;

measuring the second balance time of the second cell;

updating the second pre-balance time for each balancing cycle based on the second pre-balance time and the second balance time from the previous balancing cycle; and adjusting the first pre-balance time of the first cell and the second pre-balance time of the second cell based on a minimum value between the updated first pre-balance time and the updated second pre-balance time.

14. The method of claim 13, further comprising:

adjusting the first pre-balance time of the first cell by subtracting the minimum value from the first pre-balance time.

15. The method of claim 11, further comprising:

enabling the first shunt path in a plurality of discrete time slots if the first cell is unbalanced; and summing up the discrete time slot to generate the first balance time.

* * * * *